US 6,631,048 B1

(12) United States Patent
Tanaka

(10) Patent No.: US 6,631,048 B1
(45) Date of Patent: *Oct. 7, 2003

(54) MAGNETIC REPRODUCING APPARATUS WITH MR HEADS

(75) Inventor: Hiroyuki Tanaka, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/470,439

(22) Filed: Dec. 22, 1999

(30) Foreign Application Priority Data

Dec. 25, 1998 (JP) .................................... 10-371018

(51) Int. Cl.[7] .............................................. G11B 5/596
(52) U.S. Cl. ................................................... 360/77.04
(58) Field of Search ............................... 360/66, 77.04, 360/46

(56) References Cited

U.S. PATENT DOCUMENTS

| 5,412,518 A | | 5/1995 | Christner et al. ............ 360/66 |
| 5,774,291 A | | 6/1998 | Contreras et al. ............ 360/67 |
| 6,067,200 A | * | 5/2000 | Ohba et al. .................. 360/66 |
| 6,111,715 A | * | 8/2000 | Tsuchiya et al. ............. 360/66 |

FOREIGN PATENT DOCUMENTS

| EP | 853310 | 7/1998 |
| JP | 10105909 | 4/1998 |

* cited by examiner

Primary Examiner—David Hudspeth
Assistant Examiner—Mitchell Slavitt
(74) Attorney, Agent, or Firm—Greer, Burns & Crain, Ltd.

(57) ABSTRACT

A magnetic reproducing apparatus has an MR head for each recording surface of a recording medium. The apparatus is capable of supplying a proper sense current to each MR head even if a control board of the apparatus is replaced, thereby improving the durability and reliability of the MR heads. Each MR head reads information from a recording surface of a recording medium in response to a sense current supplied to the MR head. The read information is decoded through a decoder. Whenever a power source of the apparatus is turned on, a resistance value of a magnetoresistive element of each MR head is measured. The measured resistance value is converted into a proper sense current value with the use of a conversion table. Based on the proper sense current value, a sense current is supplied to the MR head until the power source of the apparatus is turned off. As a result, the sense current supplied to the MR head is correct even if the control board is replaced.

7 Claims, 11 Drawing Sheets

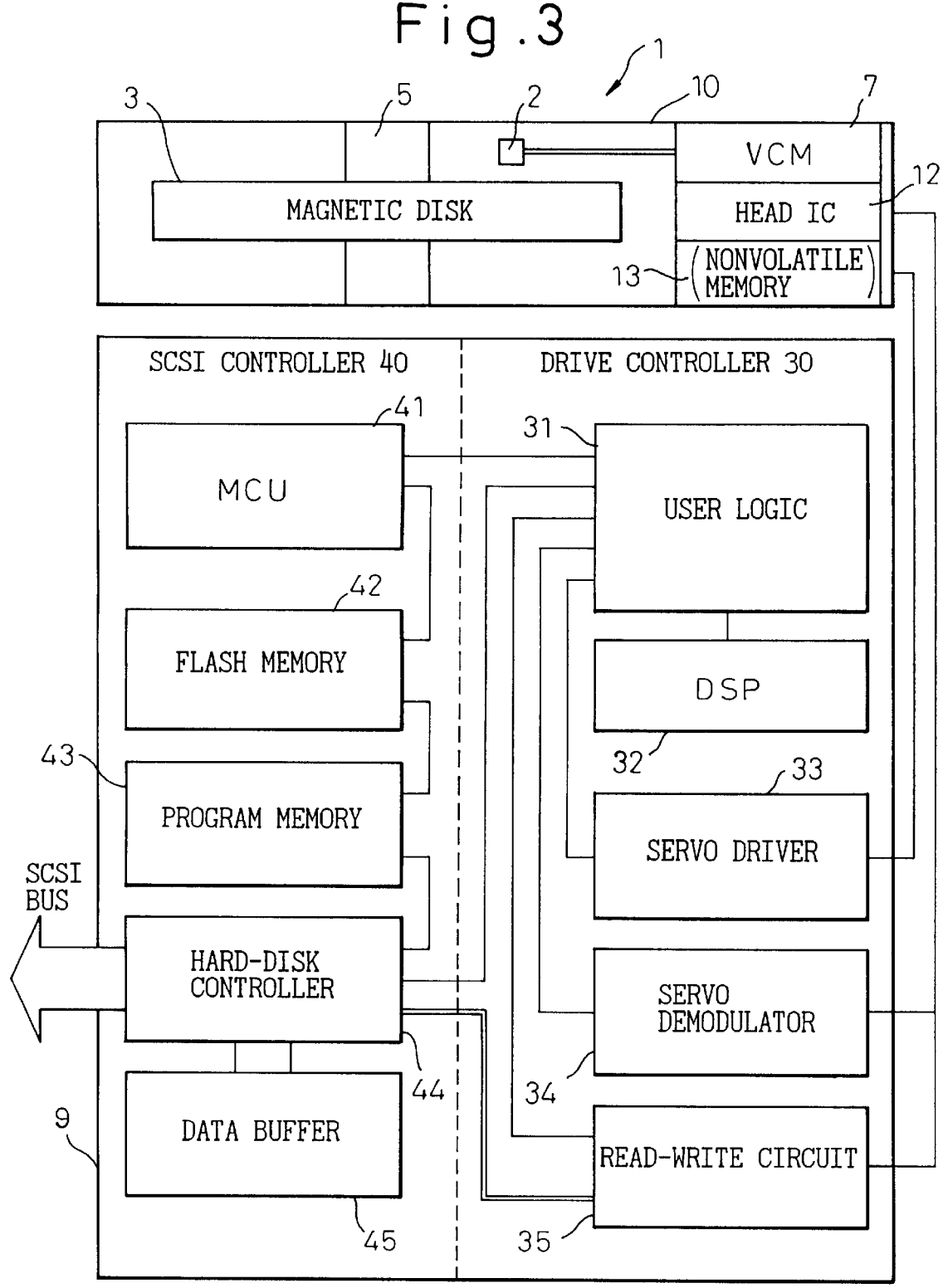

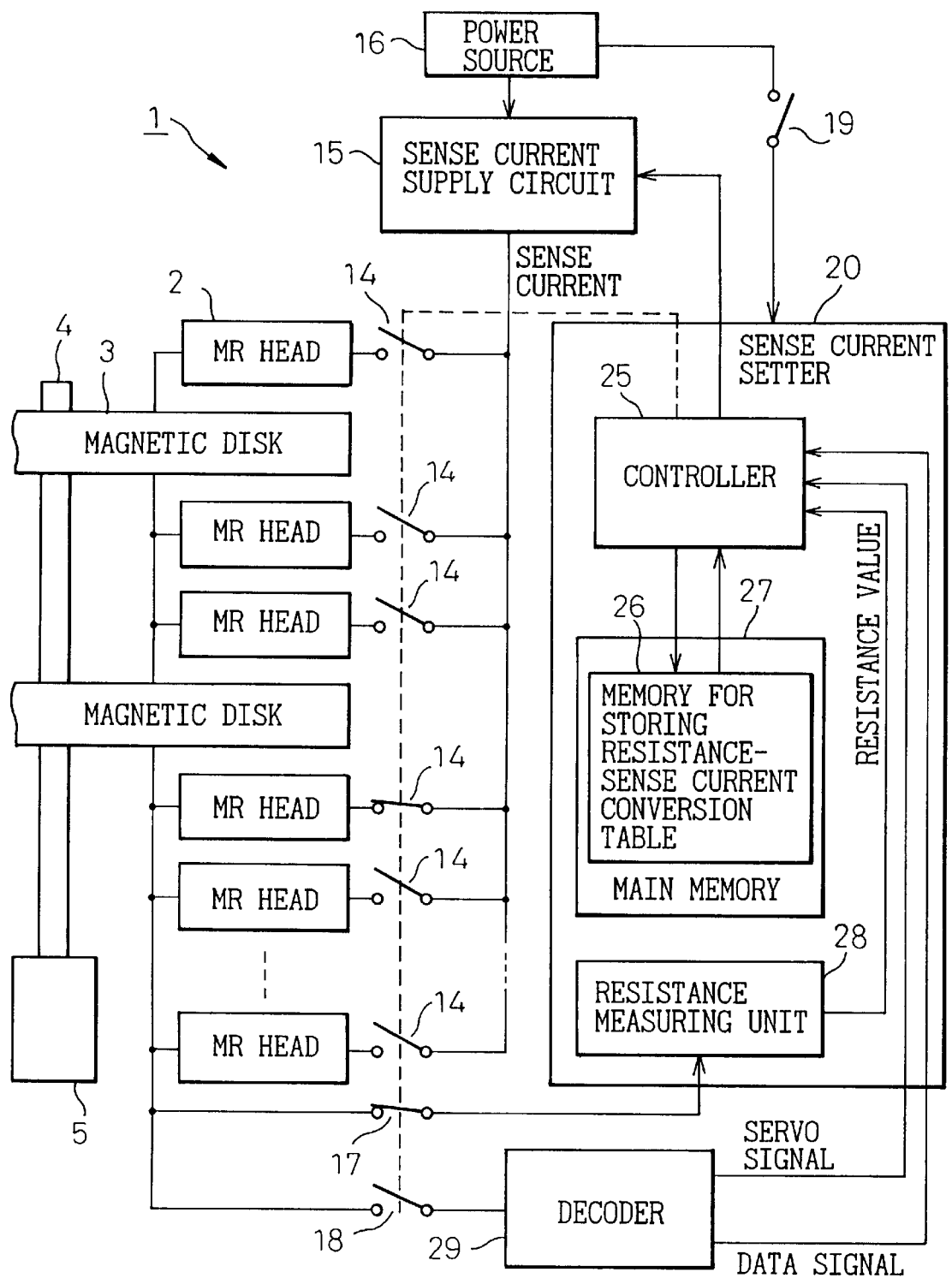

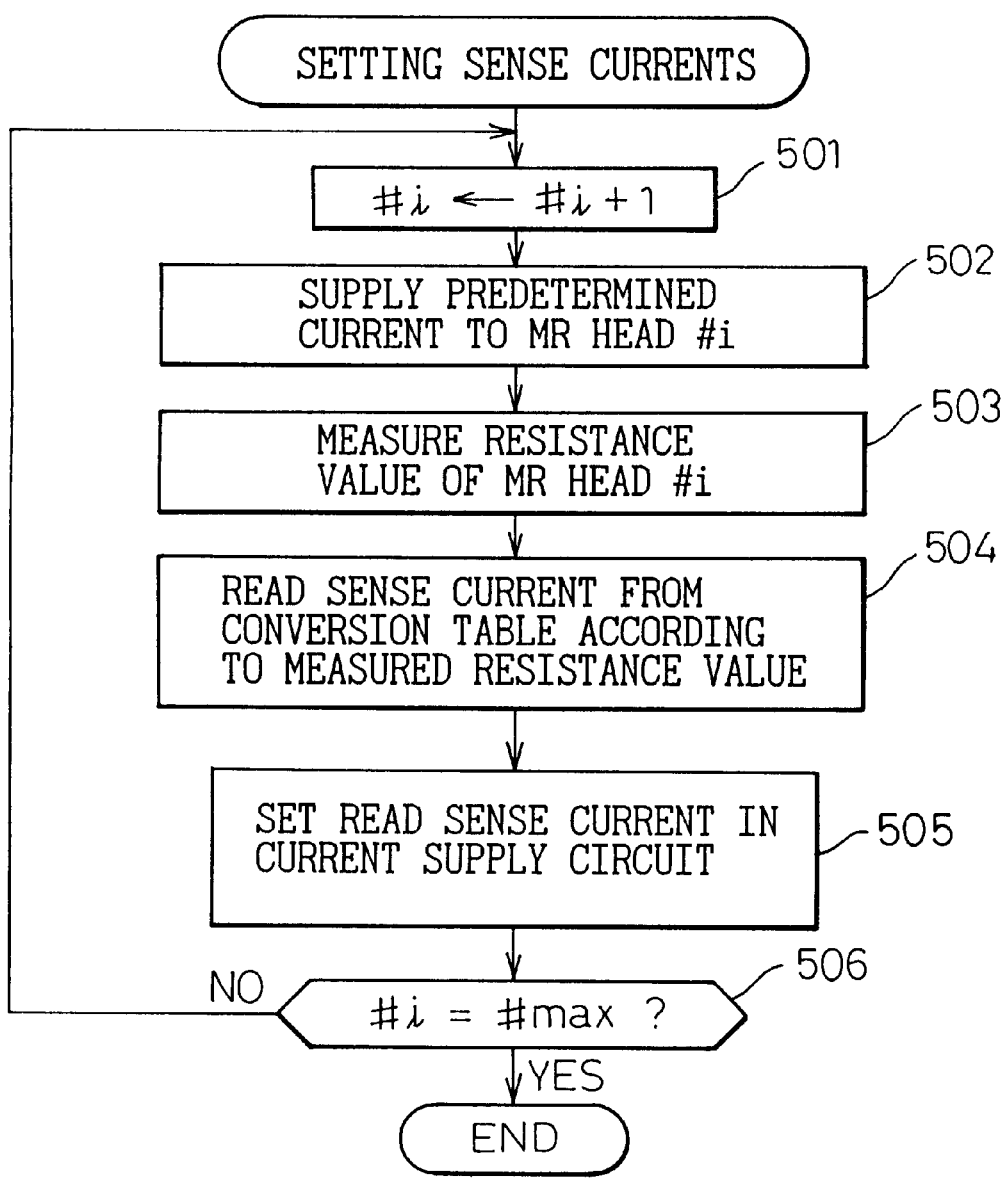

MAGNETIC REPRODUCING APPARATUS WITH MR HEADS

BACKGROUND OF THE INVENTION

1. Field of the Invention

The present invention relates to a magnetic reproducing apparatus having MR (magnetoresistive) heads, and particularly, to a magnetic reproducing apparatus capable of supplying an optimum sense current to each MR head for reproducing information recorded on a magnetic recording medium.

2. Description of the Related Art

Magnetic recording-reproducing apparatuses such as magnetic disk units and magnetic tape units employ combined heads each consisting of a wound thin-film magnetic head (inductive head) for recording information on a magnetic recording medium and an MR head for reproducing the recorded information.

The MR head has a magnetoresistive element whose resistance changes in response to an external magnetic field, to detect a leakage magnetic field due to magnetization reversal on a recording medium where information is recorded. When using the magnetoresistive element, a sense current is supplied thereto. Compared with the inductive head, the MR head is capable of providing a relatively large output that is proportional to a flux quantity from a recording medium, independently of a relative speed between the MR head and the recording medium. The MR head, therefore, is suitable for reproducing information from high-density recording tracks. If an optimum sense current is supplied, the MR head provides a large reproduced signal irrespective of a relative speed between the MR head and a recording medium such as a disk. The MR head is widely used because it satisfies requirements for increasing the capacity of high-density magnetic disk units used as external storage units of computers.

A magnetic reproducing apparatus having MR heads generally consists of a casing and a control board. The casing accommodates magnetic disks, a driving system for the magnetic disks, an actuator for writing and reading information to and from the magnetic disks through combined heads, and a head driving IC. The control board is attached to the outside of the casing and usually has a servo system for positioning the heads on tracks of the magnetic disks, a read-write circuit for decoding information read from the magnetic disks and writing information to the magnetic disks, a memory such as a ROM for storing a control program, a RAM for temporarily storing data, and a control circuit for carrying out various control tasks.

When a power source is turned on, the apparatus reads sense current values to be supplied to the MR heads from the memory on the control board and supplies sense currents accordingly to the MR heads to read various pieces of data from the magnetic disks. The sense current values stored in the memory are optimum values found through tests carried out in advance.

The sense current values stored in the memory will not be optimum for the MR heads if the control board is replaced due to a repair. If sense current values stored in the replaced control board are extremely high for the MR heads, they will shorten the service lives of the MR heads and deteriorate the reliability thereof.

To cope with this problem, there is a technique not to use the sense current values stored in the replacement control board. Instead, the technique unconditionally supplies small sense currents to the MR heads to read surface analysis (SA) data from the magnetic disks. The SA data contains sense current values to be supplied to the MR heads.

The small currents to read the SA data, however, are not optimum for the MR heads, and therefore, raise a problem of incorrectly reading the SA data from the magnetic disks.

SUMMARY OF THE INVENTION

An object of the present invention is to provide a magnetic reproducing apparatus capable of solving the problems of the prior art, always supplying optimum sense current to MR heads even if a control board is replaced, and improving the durability and reliability of the MR heads.

In order to accomplish the object, a first aspect of the present invention provides a magnetic reproducing apparatus having at least one recording medium for magnetically recording information, an MR head arranged for each recording surface of the recording media, a current supply circuit for supplying sense currents to the MR heads, respectively, so that each MR head may read information from the recording medium, and a decoder for decoding the read information. The magnetic reproducing apparatus consists of a resistance measuring circuit for measuring a resistance value of a magnetoresistive element of each MR head whenever a power source of the magnetic reproducing apparatus is turned on, a memory for storing a conversion table containing resistance values of magnetoresistive elements measured in advance and sense current values corresponding to the resistance values, and a sense current setter for reading, from the conversion table, sense current values corresponding to the resistance values of the MR heads measured by the resistance measuring circuit and setting the read sense current values in the current supply circuit, so that the current supply circuit keeps the set sense current values until the magnetic reproducing apparatus is turned off and supplies sense currents to the MR heads based on the set sense current values.

The first aspect is capable of setting proper sense currents for the MR heads according to the resistance values of the MR heads even if a control board attached to the magnetic reproducing apparatus is replaced.

In addition to the arrangement of the first aspect, a second aspect of the present invention employs a positioning mechanism for reading servo data from the recording media through the MR heads that receive the sense currents set by the sense current setter and positioning each MR head on a predetermined track on the recording medium according to the servo data a fetching circuit for reading surface analysis data from the predetermined track, fetching sense current data for each MR head from the surface analysis data, and storing the fetched sense current data, and a sense current resetter for resetting the sense current values in the current supply circuit to optimum ones for the MR heads based on the fetched sense current data.

The second aspect resets sense currents to be supplied to the MR heads according to surface analysis data that has been written in the recording media in advance, thereby ensuring the correctness of the sense currents to the MR heads even if the control board is replaced.

In addition to the arrangement of the second aspect, a third aspect of the present invention employs a comparator for comparing a casing number of the magnetic reproducing apparatus contained in the surface analysis data with a casing number of the magnetic reproducing apparatus stored in a nonvolatile memory arranged on the control board, and a prohibition circuit for prohibiting the sense current resetter from resetting the sense current values in the current supply circuit if a result of the comparison shows disagreement.

A fourth aspect of the present invention provides a magnetic reproducing apparatus having at least one recording medium for magnetically recording information, an MR head arranged for each recording surface of the recording media, a current supply circuit for supplying sense currents to the MR heads, respectively, so that each MR head may read information from the recording medium, and a decoder for decoding the read information. The magnetic reproducing apparatus consists of a nonvolatile memory arranged in a casing of the magnetic reproducing apparatus, for storing values of sense currents to be supplied to the MR heads, and a sense current setter for reading the sense current values from the nonvolatile memory when the magnetic reproducing apparatus is driven and setting the read values in the current supply circuit so that the current supply circuit supplies sense currents to the MR heads based on the set values.

The fourth aspect sets sense current values to be supplied to the MR heads according to sense current values stored in the nonvolatile memory arranged in the casing of the apparatus, thereby optimizing the sense currents to the MR heads even if a control board attached to the magnetic reproducing apparatus is replaced.

In addition to the arrangement of the fourth aspect, a fifth aspect of the present invention stores, in a nonvolatile memory, a program for reading surface analysis data from a predetermined track on a recording medium through an MR head.

In addition to the arrangement of the fifth aspect, a sixth aspect of the present invention employs a positioning mechanism for reading servo data from the recording media through the MR heads that receive the sense currents from the current supply circuit and positioning each MR head on a predetermined track on the recording medium according to the servo data, a fetching circuit for reading surface analysis data from the predetermined track, fetching sense current data for each MR head from the surface analysis data, and storing the fetched sense current data, and a sense current resetter for resetting the sense current values in the current supply circuit to optimum ones for the MR heads based on the fetched sense current data.

The sixth aspect resets sense currents to be supplied to the MR heads according to surface analysis data that has been written in the recording media in advance, thereby ensuring the correctness of the sense currents to the MR heads even if the control board is replaced.

A seventh aspect of the present invention is based on the second aspect and employs, as the sense current data for the MR heads contained in the surface analysis data, resistance values of the MR heads. According to the seventh aspect, the sense current resetter has a conversion table containing resistance values of MR heads and optimum sense current values corresponding to the resistance values, to convert the resistance values fetched from the surface analysis data into sense current values and reset the sense current values in the current supply circuit to the converted sense current values.

In addition to the arrangement of any one of the sixth and seventh aspects, an eighth aspect of the present invention employs a comparator for comparing a casing number of the magnetic reproducing apparatus contained in the surface analysis data with a casing number of the magnetic reproducing apparatus stored in a nonvolatile memory arranged on the control board, and a prohibition circuit for prohibiting the sense current resetter from resetting the sense current values in the current supply circuit if a result of the comparison shows disagreement.

In addition to the arrangement of the first aspect, a ninth aspect of the present invention employs a positioning mechanism for reading servo data from the recording media through the MR heads that receive the sense currents set by the sense current setter and positioning each MR head on a predetermined track on the recording medium according to the servo data, a nonvolatile memory arranged on the control board, for storing a conversion table containing MR head compositions and optimum sense current values corresponding to the compositions, a fetching circuit for reading surface analysis data from the predetermined track, fetching composition data for each MR head from the surface analysis data, and storing the fetched composition data, and a sense current resetter for reading optimum sense current values for the MR heads from the conversion table according to the fetched composition data and resetting the sense current values in the current supply circuit to the read optimum sense current values.

The ninth aspect sets an optimum sense current for each MR head according to the composition of the MR head.

The magnetic reproducing apparatus with MR heads of the present invention provides the following advantages:

(1) When configured to measure the resistance value of each MR head whenever turned on, read sense current values from a conversion table according to the measured resistance values, and set sense currents to the MR heads based on the read values, the apparatus is capable of supplying correct sense currents to the MR heads even if a control board attached to the apparatus is replaced.

(2) When configured to measure the resistance value of each MR head whenever turned on, read sense current values from a conversion table according to the measured resistance values, set sense currents to the MR heads based on the read values, fetch surface analysis data from recording media through the MR heads, and reset the sense currents to the MR heads according to sense current data contained in the surface analysis data, the apparatus is capable of supplying more correct sense currents to the MR heads even if the control board is replaced.

(3) When configured to employ a nonvolatile memory installed in the casing of the apparatus for storing sense current values for the MR heads, read the sense current values from the memory, and set sense currents to the MR heads based on the read values, the apparatus is capable of always supplying optimum sense currents to the MR heads even if the control board is replaced.

(4) When configured to employ a nonvolatile memory installed on the control board for storing a conversion table containing MR head compositions and sense currents corresponding to the compositions and read optimum sense currents from the table according to the compositions of the MR heads, the apparatus is capable of supplying sense currents that are optimum for the compositions of the MR heads.

BRIEF DESCRIPTION OF THE DRAWINGS

The present invention will be more clearly understood from the description as set forth below with reference to the accompanying drawings, wherein:

FIG. 3 is a circuit diagram showing an example of a control board of the apparatus of FIG. 2A;

FIG. 4 is a circuit diagram showing essential parts for determining sense currents to MR heads according to the present invention; and FIGS. 5 to 11 are flowcharts showing sequences of setting sense current values for MR heads according to first to seventh embodiments of the present invention.

DESCRIPTION OF THE PREFERRED EMBODIMENTS

The embodiments of the present invention will be explained in detail with reference to the drawings.

Figure 1:
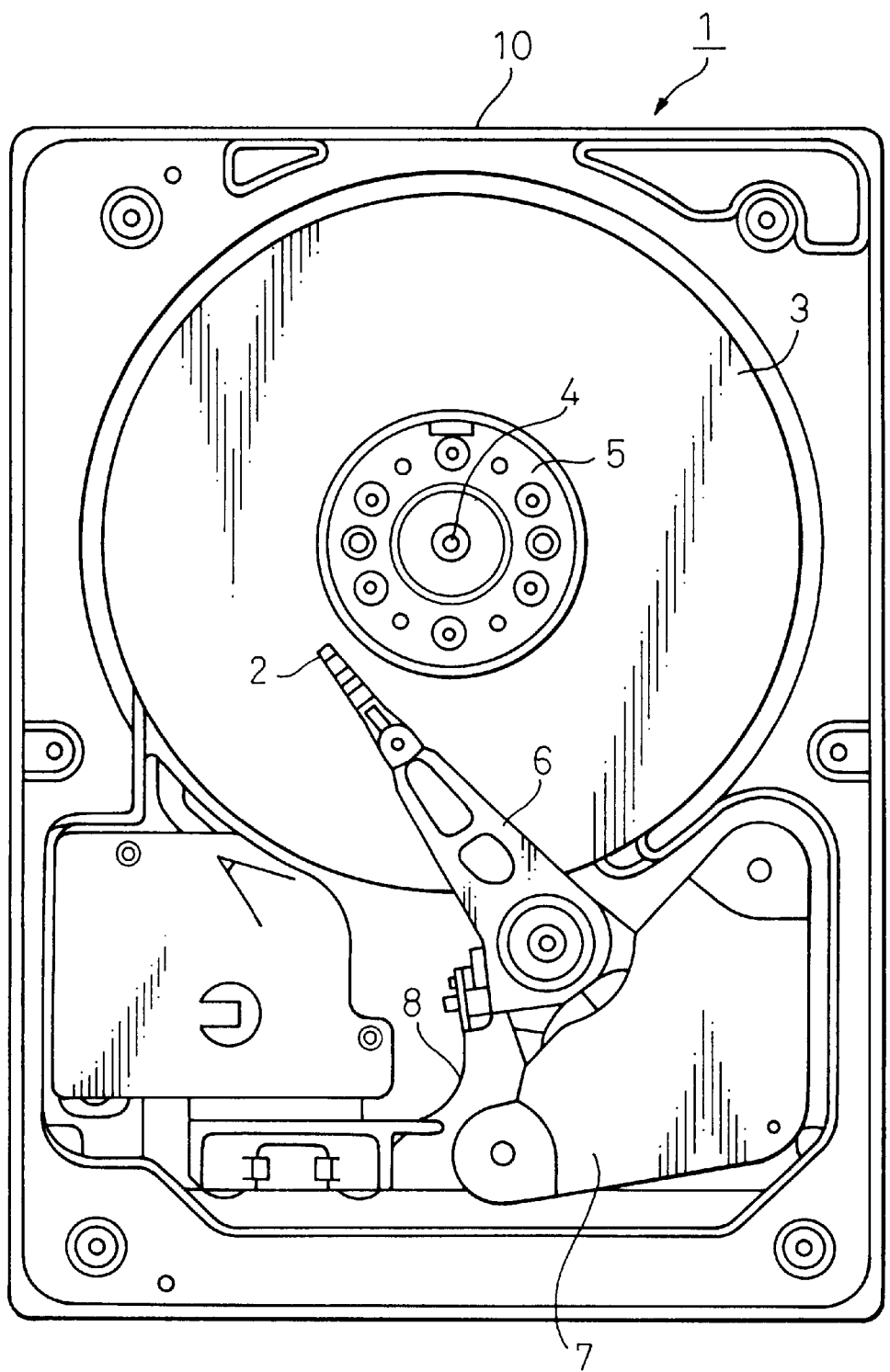
FIG. 1 is a general plan view showing a magnetic reproducing apparatus according to the present invention.

FIG. 1 shows a magnetic reproducing apparatus 1 according to the present invention. In this embodiment, the apparatus 1 is a magnetic disk unit having MR heads 2.

The magnetic disk unit 1 has a casing 10 in which at least one magnetic disk 3 serving as a recording medium is fixed to a rotation shaft 4. The shaft 4 is rotated by a spindle motor 5. Each magnetic disk 3 has recording surfaces each of which faces an MR head 2 for reading information magnetically recorded on the magnetic disk 3. The MR head 2 is attached to the tip of a carriage 6. The carriage 6 is driven by a voice coil motor (VCM) 7. Data read from the disk 3 through the MR head 2 is passed through a flexible cable 8 to a head IC arranged in the casing 10.

Figure 2A:
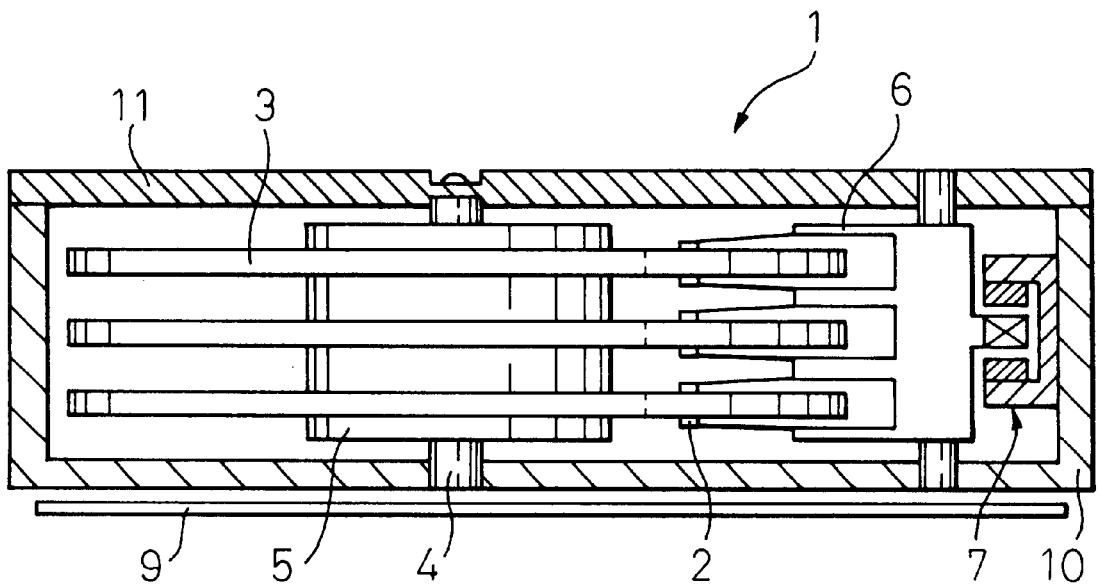
FIG. 2A is a vertical section showing the apparatus of FIG. 1.

FIG. 2A shows the apparatus of FIG. 1 having three magnetic disks 3. The same numerals as those of FIG. 1 represent the same parts. The casing 10 has a bathtub shape covered with a top cover 11. The bottom of the casing 10 is provided with a control board 9 having a circuit for positioning the MR heads 2, a circuit for decoding data read through the MR heads 2, etc. Circuits arranged inside the casing 10 and the control board 9 are connected to each other through flexible cables (not shown).

Figure 2B:
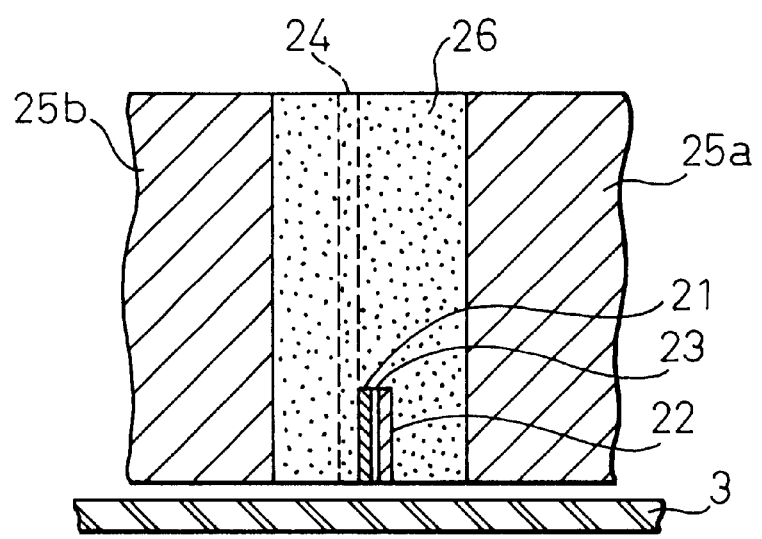
FIG. 2B is an enlarged section showing an MR head of the apparatus of FIG. 2A.

FIG. 2B is an enlarged view showing a typical structure of any one of the MR heads 2. The MR heads 2 are arranged to face the corresponding magnetic disks 3. Each MR head 2 consists of an MR film 21, a soft magnetic film 22, a nonmagnetic isolation film 23, a conductive lead layer 24, magnetic shields 25a and 25b, and a nonmagnetic insulation layer 26. The MR film 21 detects a flux change as a current change. The MR film 21 is made of ferromagnetic material NiFe. The soft magnetic film 22 is made of CoZr whose MR effect is small. The nonmagnetic isolation film 23 is, for example, a Ti film serving as a conductive intermediate film. The film 23 may be made of a conductive material or an insulating material. The three films 21 to 23 are laminated one upon another and are electrically joined together. The conductive lead layer 24 is made of Au, and the magnetic shields 25a and 25b are made of, for example, NiFe films.

The MR head 2 having such a structure is used by supplying a sense current to the conductive lead layer 24. When the sense current is optimum, the MR head 2 provides a large reproduced signal irrespective of a relative speed between the MR head 2 and the disk 3, and therefore, it is important to supply a proper sense current to each MR head 2.

FIG. 3 shows an example of the control board 9 of FIG. 2A. The control board 9 includes a drive controller 30 and a SCSI (small computer system interface) controller 40. The drive controller 30 controls the driving of the spindle motor 5 for revolving the magnetic disks 3, the VCM 7 for positioning the MR heads 2, and the head IC 12. The casing 10 may have a nonvolatile memory 13. The drive controller 30 has a user logic 31, a DSP (digital signal processor) 32, a serve driver 33, a servo demodulator 34, a read-write circuit 35, etc. The SCSI controller 40 has an MCU 41, a flash memory 42, a program memory 43, a hard-disk controller 44, a data buffer 45, etc. The operations of these elements are known and, therefore, are not explained. Only the parts characteristic to the present invention to determine the sense currents to be supplied to the MR heads 2 will be explained.

FIG. 4 shows the characteristic parts of the present invention for determining sense currents to be supplied to the MR heads 2. The rotation shaft 4 rotated by the spindle motor 5 holds the magnetic disks 3. Each MR head 2 is arranged to face a corresponding recording surface of the magnetic disks 3. Each MR head 2 is connected to an ON-OFF switch 14 in series. Pairs of the MR head 2 and switch 14 are connected in parallel with one another and are connected to a sense current supply circuit 15. The circuit 15 receives a current from a power source 16 so that the circuit 15 may supply proper sense currents to the MR heads 2, respectively.

A sense current setter 20 sets sense current values for the MR heads 2 in the sense current supply circuit 15. The setter 20 has a controller 25, a memory 26 for storing a conversion table containing resistance values of MR elements and sense currents corresponding to the resistance values, a main memory 27 that includes the memory 26, and a resistance measuring unit 28. A decoder 29 is related to the operation of the setter 20. The switches 14 are directly connected to the MR heads 2, respectively, and are turned on and off in response to signals from the controller 25. A resistance measuring switch 17 and a decoding switch 18 are commonly connected to the MR heads 2. When turned on, the switch 17 passes the outputs of the MR heads 2 to the resistance measuring unit 28, and the switch 18 passes the outputs of the MR heads 2 to the decoder 29. The switches 17 and 18 are turned on and off in response to the output of the controller 25.

FIG. 5 is a flowchart showing a sequence of setting a proper sense current value for each MR head 2 in the sense current supply circuit 15 by the controller 25 according to the first embodiment of the present invention. The details of the flowchart will be explained with reference to FIG. 4.

A power source switch 19 is turned on to activate the sense current setter 200. The setter 20 turns on the switch 17 so that the output of each MR head 2 is transferred to the resistance measuring unit 28. Then, the sequence of FIG. 5 is carried out. In the following explanation, an "i"th MR head 2 is expressed as an MR head #i. When the switch 19 is turned on, "i" is initialized to "0."

Step 501 increments the MR head number #i by one. Since "i" is 0, it is incremented to 1. In step 502, the controller 25 turns on the switch 14 of the MR head #1 so that the sense current supply circuit 15 supplies a predetermined resistance measuring current to the MR head #1. In step 503, the resistance measuring unit 28 measures a resistance value of the MR head #1. The measured value is transferred to the controller 25.

In step 504, the controller 25 refers to the resistance-sense current conversion table in the memory 26 and reads therefrom a sense current value corresponding to the measured resistance value. In step 505, the controller 25 sets the read sense current value in the current supply circuit 15 as a sense current value for the MR head #1.

Step 506 checks to see if the MR head number #i is a maximum value #max. Namely, step 506 determines whether or not resistance values of all MR heads 2 have been measured. If #i is not #max, the flow returns to step 501, which increments the MR head number #i by one and repeats steps up to step 506. Repetitions of steps 501 to 506 are terminated if step 506 determines that resistance values of all MR heads 2 have been measured. Note that steps 504 and 505 can be carried out after the resistance values of all MR heads 2 have been measured, instead of being carried out between steps 503 and 506.

In this way, the controller 25 sequentially turns on the switches 14 of the MR heads 2, sequentially supplies the predetermined measuring current from the sense current supply circuit 15 to the MR heads 2, measures the resistance of each MR head 2, determines a sense current value for the MR head 2 according to the measured resistance value, and sets the determined sense current value in the supply circuit 15. If sense current values for all MR heads 2 are set in the circuit 15, the controller 25 turns off the switch 17 and turns on the decoding switch 18. As a result, data detected by the MR heads 2 on the magnetic disks 3 is transferred to the decoder 29, which decodes the data into a servo signal and data signal. These signals are transferred to the controller 25.

Figure 6:
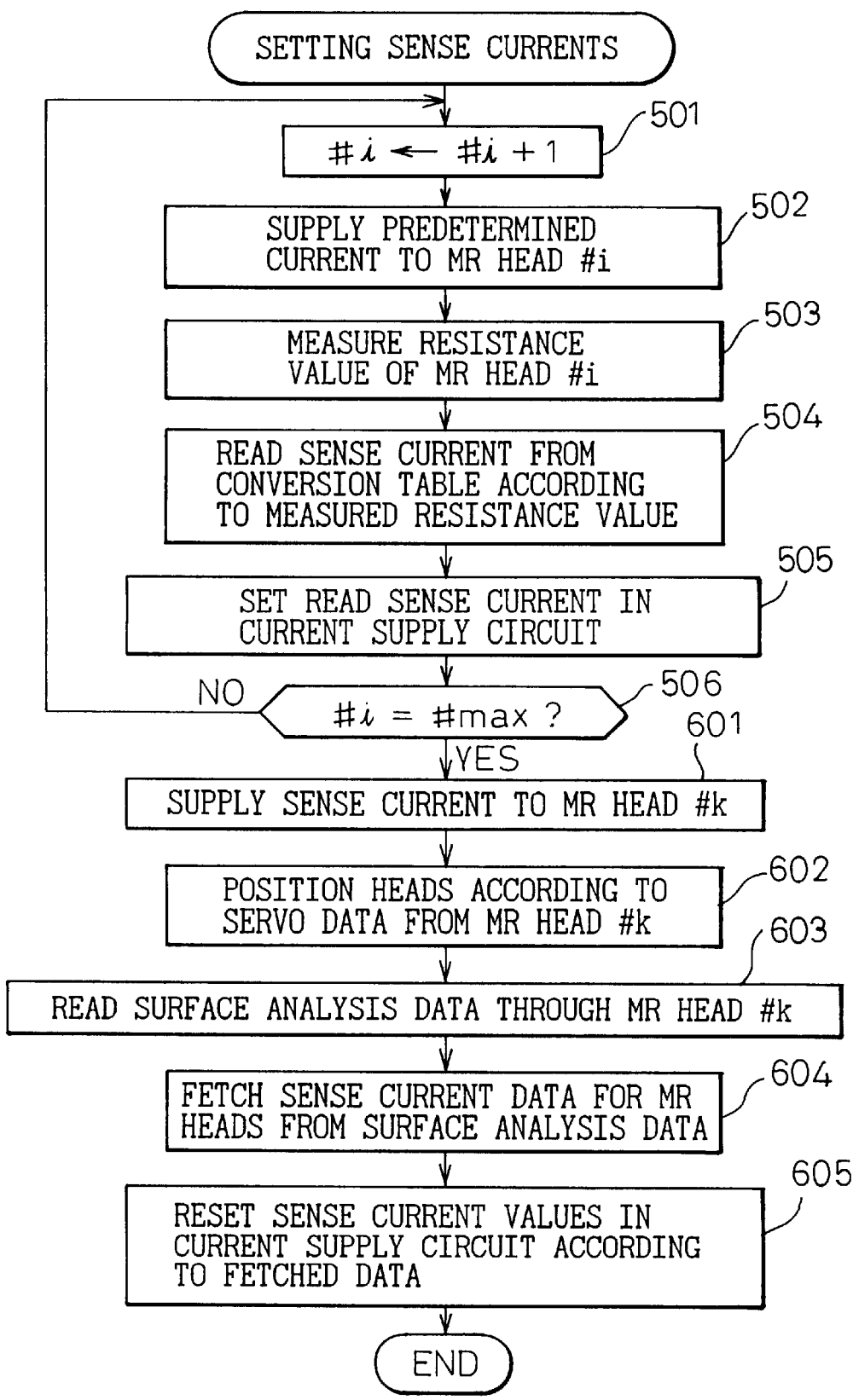

FIG. 6 is a flowchart showing a sequence of setting a sense current value for each MR head 2 in the sense current supply circuit 15 according to the second embodiment of the present invention. When the power source switch 19 is turned on the controller 25 sequentially supplies a predetermined current to the MR heads 2, measures a resistance value of each MR head 2, retrieves a sense current value from the conversion table in the memory 26 according to the measured value, and sets the retrieved current value in the circuit 15. These are carried out in steps 501 to 506 that are equal to those of the first embodiment of FIG. 5, and therefore, will not be explained again.

The second embodiment differs from the first embodiment in that it supplies sense currents to the MR heads 2 based on the sense current values set in the circuit 15 to position the MR heads 2 on the magnetic disks 3, reads surface analysis data from the disks 3, and resets the sense current values in the circuit 15 to optimum ones for the MR heads 2 according to the surface analysis data.

More precisely, after step 506 determines that sense current values for all MR heads 2 have been set according to measured resistance values, step 601 supplies a sense current to a "k"th MR head #k according to the sense current value set in step 505 for the MR head #k. Once step 506 provides "YES," it is assumed that the controller 25 turns off the resistance measuring switch 17 and on the decoding switch 18.

In step 602, the MR head #k reads data from the magnetic disk 3, the decoder 29 decodes the data into servo data, which is supplied to the controller 25, and the controller 25 positions the MR head #k according to the servo data. When the MR head #k is positioned onto a predetermined track, the other MR heads are also positioned onto the same cylinder. Step 603 reads surface analysis data from the magnetic disk 3 through the MR head #k. The surface analysis data contains optimum current values for the MR heads 2.

In step 604, the controller 25 retrieves the sense current values for the MR heads 2 from the surface analysis data. In step 605, the controller 25 resets the sense current values in the sense current supply circuit 15 to the retrieved sense current values. Thereafter, the circuit 15 supplies sense currents to the MR heads 2 according to the reset sense current values.

Figure 7:
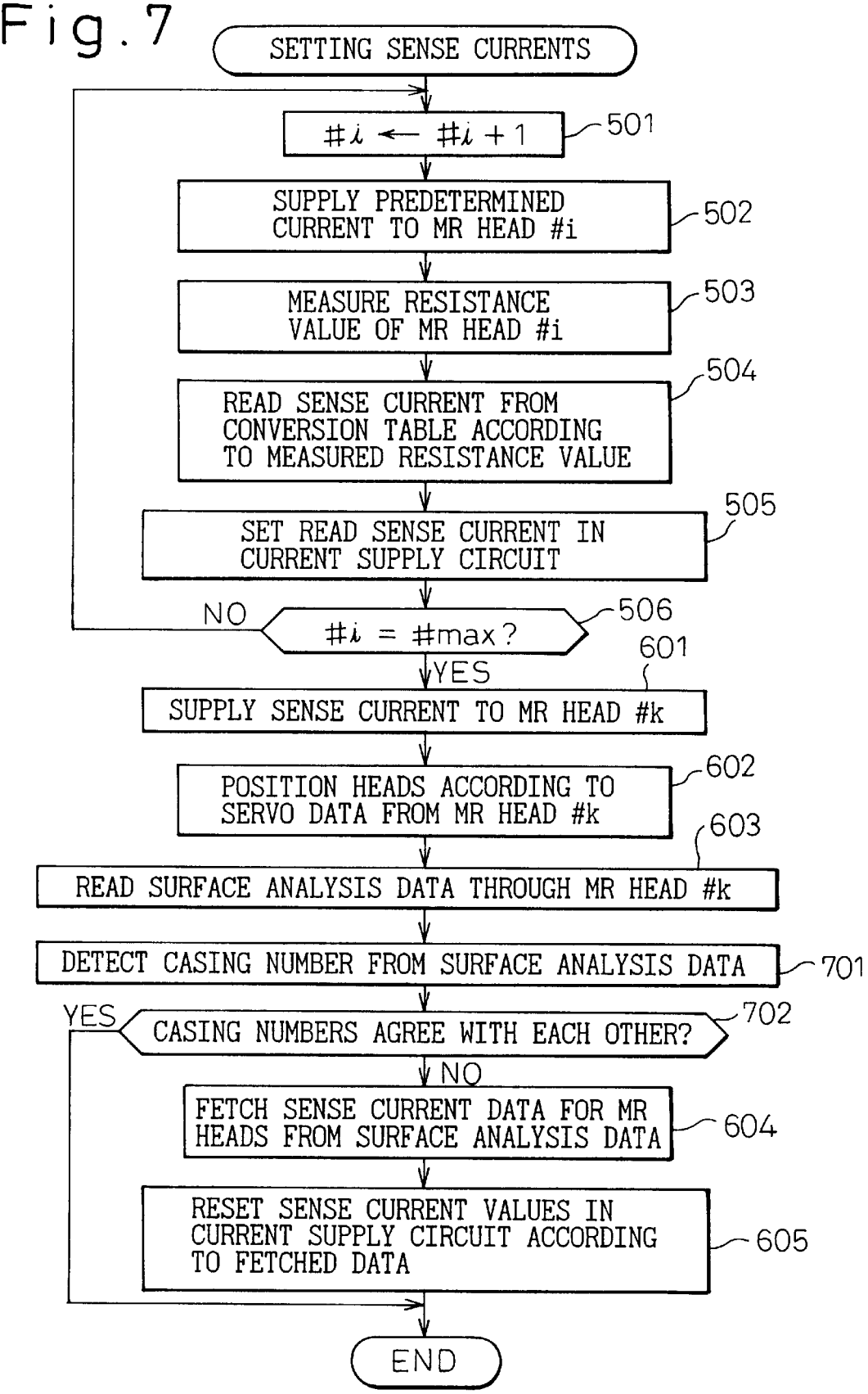

FIG. 7 is a flowchart showing a sequence of setting a sense current for each MR head 2 in the sense current supply circuit 15 according to the third embodiment of the present invention. The third embodiment is based on the second embodiment. The difference between them is that the third embodiment inserts steps 701 and 702 between steps 603 and 604 of the second embodiment. Explanation of steps the same as those of the second embodiment will be omitted.

According to the third embodiment, step 603 reads surface analysis data, step 701 detects a casing number of the apparatus 1 from the surface analysis data, and step 702 checks to see if the detected casing number agrees with a casing number of the apparatus 1 recorded in, for example, a nonvolatile memory arranged on the control board 9. If they disagree with each other, steps 604 and 605 are carried out, as in the second embodiment, to fetch sense current data for each MR head from surface analysis data and reset the sense current values in the sense current supply circuit 15 to optimum ones according to the fetched sense current data.

If step 702 determines that the detected casing number agrees with the stored casing number, the routine ends. In this case, sense currents set in step 505 for the MR heads 2 are used as they are.

Figure 8:
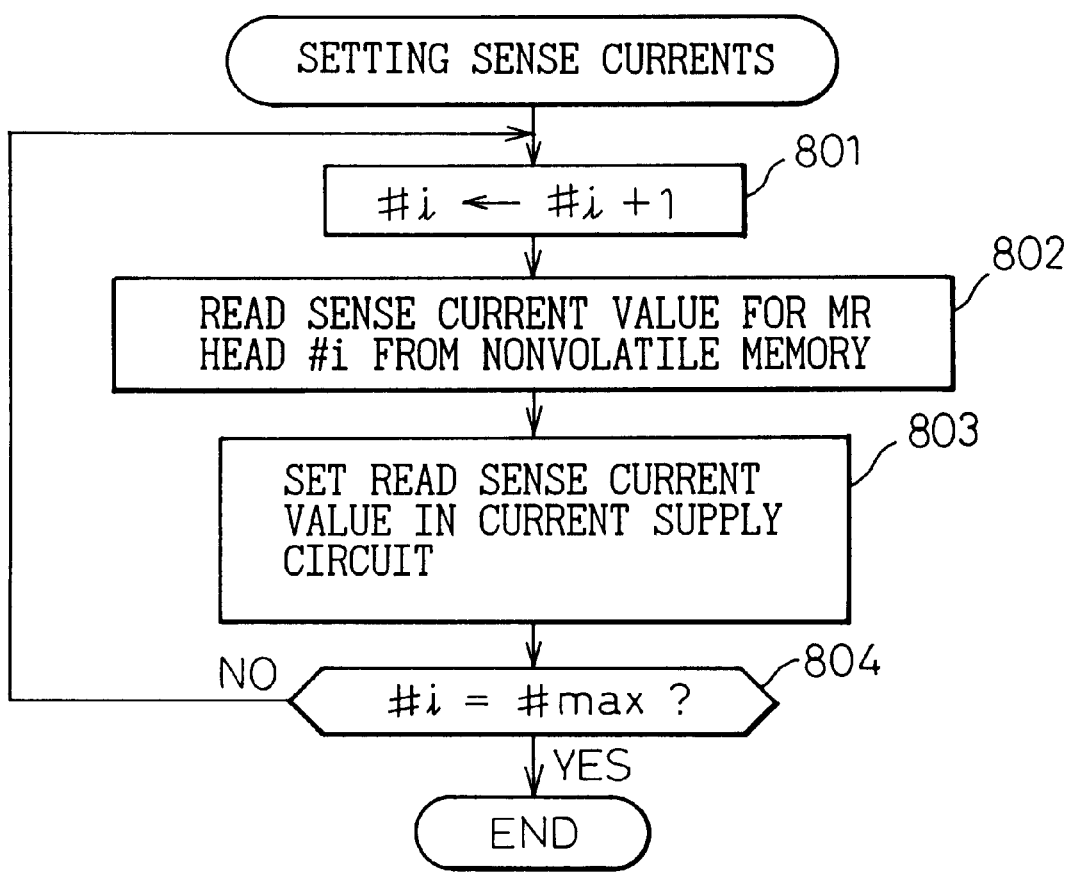

FIG. 8 is a flowchart showing a sequence of setting a sense current value for each MR head 2 in the sense current supply circuit 15 according to the fourth embodiment of the present invention. The fourth embodiment arranges a nonvolatile memory 13 in the casing 10 as shown in FIG. 3 and stores sense current values for the MR heads 2 in the memory 13. When the power source switch 19 of FIG. 4 is turned on, the MR head number "i" is initialized to "0."

Step 801 increments the MR head number #i by one. Since the initial value of the number "i" is 0, it is incremented to "1" at first. In step 802, the controller 25 reads a sense.current value for the MR head #1 from the memory 13. In step 803, the controller 25 sets the read sense current value in the sense current supply circuit 15 for the MR head #1.

Step 804 checks to see if the MR head number #i is a maximum number #max. Namely, step 804 determines if sense current values for all MR heads 2 have been read out of the memory 13. If #i is not #max, the flow returns to step 801, which increments the number #i by one and repeats steps up to step 804. Repetitions of steps 801 to 804 are terminated when step 804 determines that sense currents for all MR heads 2 have been read out of the memory 13.

In this way, the controller 25 sequentially reads sense current values for the MR heads 2 out of the memory 13 and sets the read sense current values in the sense current supply circuit 15. When sense current values have been set for all MR heads 2 in the circuit 15, the controller 25 turns on the decoding switch 18. As a result, data detected on the magnetic disks 3 through the MR heads 2 is transferred to the decoder 29, which decodes the data into a servo signal and data signal. These signals are transferred to the controller 25.

Figure 9:
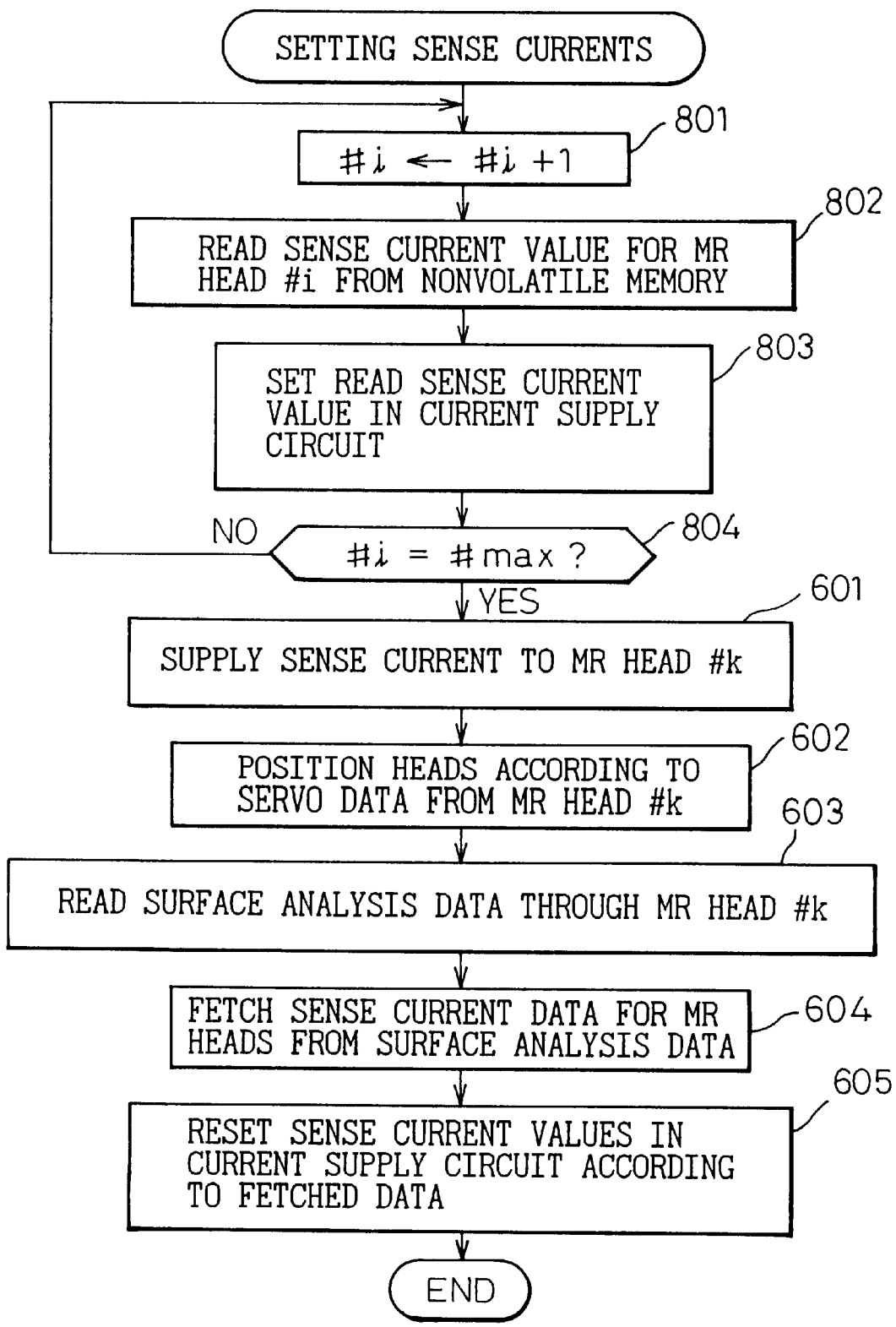

FIG. 9 is a flowchart showing a sequence of setting a sense current value for each MR head 2 in the sense current supply circuit 15 according to the fifth embodiment of the present invention. The fifth embodiment reads sense current values for the MR heads 2 out of the memory 13 arranged in the casing 10 as in the fourth embodiment and carries out steps 601 to 605 as in the second embodiment.

More precisely, the fifth embodiment carries out steps 801 to 804 as in the fourth embodiment and, as in the second embodiment, positions an MR head #k on the magnetic disk 3 by using the sense current value set in the sense current supply circuit 15, reads surface analysis data from the magnetic disk 3, and resets the sense current values for the MR heads 2 in the supply circuit 15 to sense current values obtained from the is a combination of the second and fourth embodiments, and therefore, the detailed explanation of FIG. 9 is omitted because the procedure thereof has already been explained in FIGS. 6 and 8.

Figure 10:
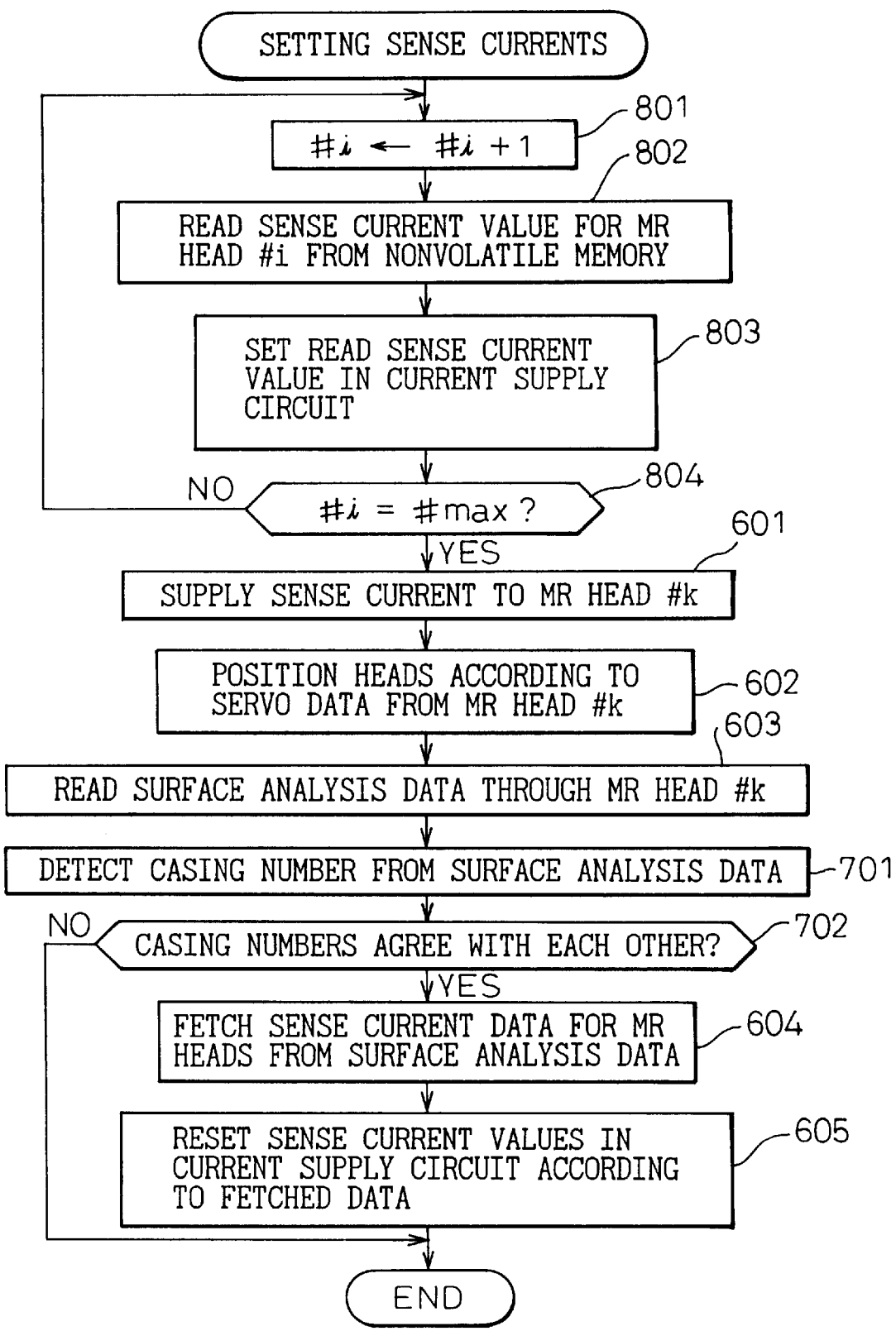

FIG. 10 is a flowchart showing a sequence of setting a sense current value for each MR head 2 in the sense current supply circuit 15 according to the sixth embodiment of the present invention. The sixth embodiment is based on the fifth embodiment and differs therefrom in that it inserts steps 701 and 702 of the third embodiment between steps 603 and 604 of the fifth embodiment. Namely, step 702 of the sixth embodiment checks to see if a casing number of the apparatus 1 detected from surface analysis data agrees with a casing number of the apparatus 1 stored in a nonvolatile memory arranged on the control board 9, as in the third embodiment. If they agree with each other, the sixth embodiment carries out steps 604 and 605 as in the fifth embodiment. If they disagree with each other, the sixth embodiment does not carry out steps 604 and 605. In FIG. 10, the same steps, as those of the third and fifth embodiments are represented by the same step numbers and their explanations are not repeated.

Figure 11:
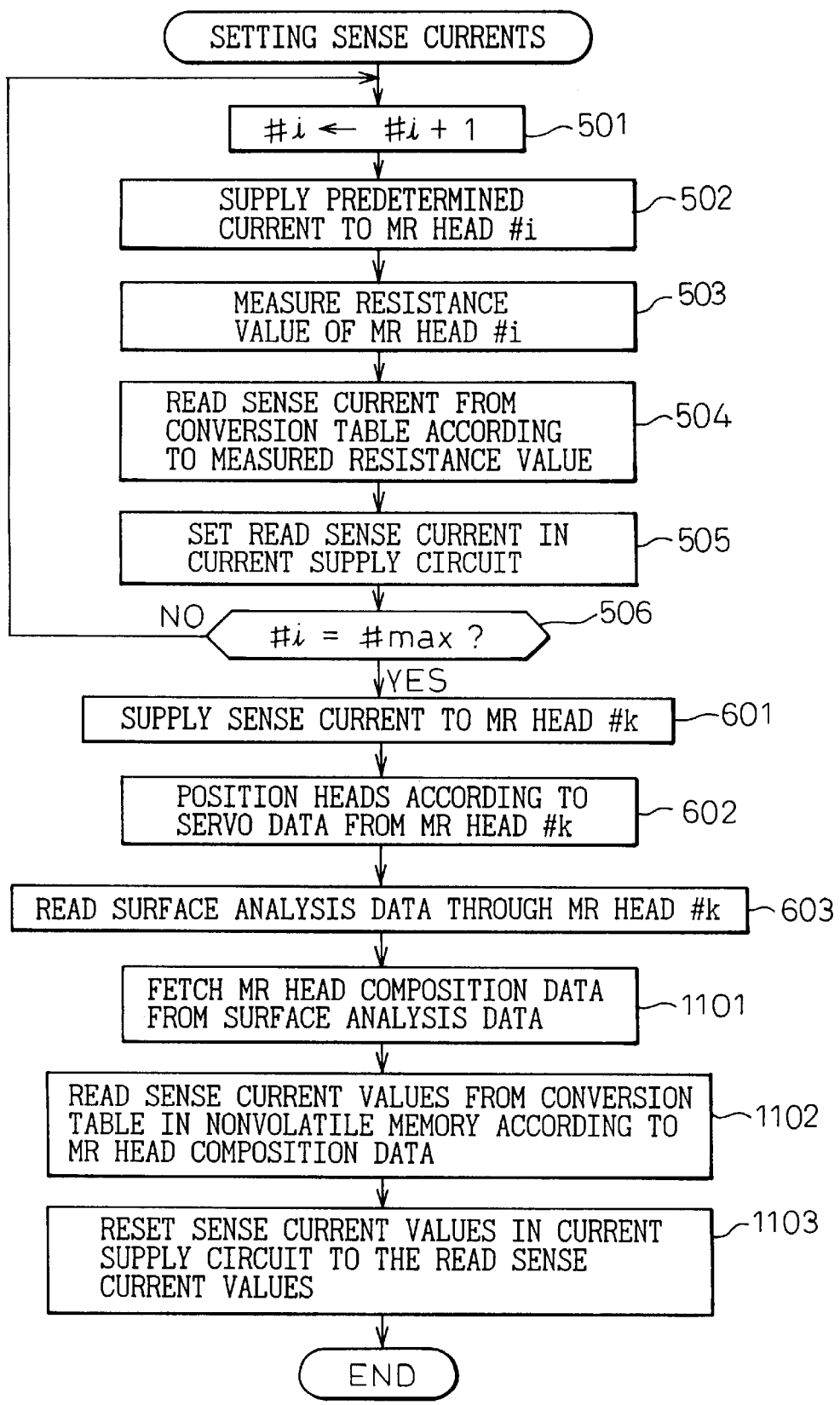

FIG. 11 is a flowchart showing a sequence of setting a sense current value for each MR head 2 in the sense current supply circuit 15 according to the seventh embodiment of the present invention. The seventh embodiment is based on the second embodiment and differs therefrom in that the seventh embodiment replaces steps 604 and 605 of the second embodiment with steps 1101 to 1103. Steps 501 to 603 of the seventh embodiment are the same as those of the second embodiment, and therefore, are not explained again.

The seventh embodiment employs the nonvolatile memory 13 arranged in the casing 10 of FIG. 3 or the nonvolatile memory arranged on the control board 9, to store a conversion table containing MR head compositions and optimum sense current values corresponding to the compositions. The magnetic disks contain surface analysis data that includes data related to the composition of each MR head 2.

According to the seventh embodiment, step 603 reads the surface analysis data through an MR head #k. Step 1101 reads composition data for each MR head from the surface analysis data. In step 1102, the controller 25 reads sense current values corresponding to the compositions of the MR heads 2 from the conversion table. In step 1103, the controller 25 resets the sense current values for the MR heads 2 in the sense current supply circuit 15 to those read in step 1102.

As a result, sense currents that are optimum for the compositions of the MR heads 2 are supplied to the MR heads 2, to improve the reproduction efficiency of the MR heads 2.

In any one of the embodiments, a control program for reading surface analysis data from a magnetic disk and retrieving sense current data for each MR head from the surface analysis data, a control program for retrieving a casing number from the surface analysis data, a control program for retrieving the composition of each MR head from the surface analysis data, etc., are stored in the program memory 43 of FIG. 3 or in any other memory.

Although the embodiments mentioned above relate to hard-disk units, the present invention is applicable to any other magnetic disk units that employ MR heads.

What is claimed is:

1. A magnetic reproducing apparatus having at least one recording medium for magnetically recording information, an MR head arranged for each recording surface of the recording media, a current supply circuit for supplying sense currents to the MR heads, respectively, so that each MR head may read information from the recording medium, and a decoder for decoding the read information, comprising:

a resistance measuring circuit for measuring a resistance value of a magnetoresistive element of each MR head whenever a power source of the magnetic reproducing apparatus is turned on;

a memory for storing a conversion table containing resistance values of magnetoresistive elements measured in advance and proper sense current values corresponding to the resistance values; and a sense current setter for reading, from the conversion table, sense current values corresponding to the resistance values of the MR heads measured by the resistance measuring circuit and setting the read sense current values in the current supply circuit, so that the current supply circuit supplies sense currents to the MR heads based on the set sense current values.

2. The magnetic reproducing apparatus of claim 1, further comprising:

a positioning mechanism for reading servo data from the recording media through the MR heads that receive the sense currents set by the sense current setter and positioning each MR head on a predetermined track on the recording medium according to the servo data;

a fetching circuit for reading surface analysis data from the predetermined track, fetching sense current data for each MR head from the surface analysis data, and storing the fetched sense current data; and a sense current resetter for resetting the sense current values in the current supply circuit to optimum ones for the MR heads based on the fetched sense current data.

3. The magnetic reproducing apparatus of claim 2, further comprising:

a comparator for comparing a casing number of the magnetic reproducing apparatus contained in the surface analysis data with a casing number of the magnetic reproducing apparatus stored in a nonvolatile memory arranged on a control board attached to the magnetic reproducing apparatus; and a prohibition circuit for prohibiting the sense current resetter from resetting the sense current values in the current supply circuit if a result of the comparison shows disagreement.

4. A magnetic reproducing apparatus having at least one recording medium for magnetically recording information, an MR head, arranged for each recording surface of the recording media, a current supply circuit for supplying sense currents to the MR heads, respectively, so that each MR head may read information for the recording medium, and a decoder for decoding the read information, comprising:

a nonvolatile memory arranged in a casing of the magnetic reproducing apparatus, for storing values of sense currents to be supplied to the MR heads, the nonvolatile memory storing a program for reading surface analysis data from a predetermined track on a recording medium through an MR head;

a sense current setter for reading the sense current values from the nonvolatile memory when the magnetic reproducing apparatus is driven and setting the read values in the current supply circuit so that the current supply circuit supplies sense currents to the MR heads based on the values;

a positioning mechanism for reading servo data from the recording media through the MR heads that receive the sense currents from the current supply circuit and positioning each MR head on a predetermined track on the recording medium according to the servo data;

a fetching circuit for reading surface analysis data from the predetermined track, fetching sense current data for each MR head from the surface analysis data, and storing the fetched sense current data;

a sense current resetter for resetting the sense current values in the current supply circuit to optimum ones for the MR heads based on the fetched sense current data;

a comparator for comparing a casing number of the magnetic reproducing apparatus contained in the surface analysis data with a casing number of the magnetic reproducing apparatus stored in a nonvolatile memory arranged on a control board attached to the magnetic reproducing apparatus; and a prohibition circuit for prohibiting the sense current resetter from resetting the sense current values in the current supply circuit if a result of the comparison shows disagreement.

5. The magnetic reproducing apparatus of claim 2, wherein:

the sense current data for the MR heads contained in the surface analysis data indicates resistance values of the MR heads; and the sense current resetter has a conversion table containing resistance values of MR heads and optimum sense current values corresponding to the resistance values, to convert the resistance values fetched from the surface analysis data into sense current values and reset the sense current values in the current supply circuit to the converted sense current values.

6. The magnetic reproducing apparatus of claim 5, further comprising:

a comparator for comparing a casing number of the magnetic reproducing apparatus contained in the surface analysis data with a casing number of the magnetic reproducing apparatus stored in a nonvolatile memory arranged on a control board attached to the magnetic reproducing apparatus; and a prohibition circuit for prohibiting the sense current resetter from resetting the sense current values in the current supply circuit if a result of the comparison shows disagreement.

7. The magnetic reproducing apparatus of claim 1, further comprising:

a positioning mechanism for reading servo data from the recording media through the MR heads that receive the sense currents set by the sense current setter and positioning each MR head on a predetermined track on the recording medium according to the servo data;

a nonvolatile memory arranged on a control board attached to the magnetic reproducing apparatus, for storing a conversion table containing MR head compositions and optimum sense current values corresponding to the compositions;

a fetching circuit for reading surface analysis data from the predetermined track, fetching composition data for each MR head from the surface analysis data, and storing the fetched composition data; and a sense current resetter for reading optimum sense current values for the MR heads from the conversion table according to the fetched composition data and resetting the sense current values in the current supply circuit to the read optimum sense current values.

* * * * *